United States Patent [19]

Middelhoek et al.

[11] 3,979,206

[45] Sept. 7, 1976

[54] PROCESS FOR THE PREPARATION OF MAGNESIUM

[75] Inventors: Servaas Middelhoek, Arnhem; Diederich J. Baan, Ede, both of Netherlands

[73] Assignee: Billiton Research B.V., Netherlands

[22] Filed: Jan. 14, 1975

[21] Appl. No.: 540,921

[30] Foreign Application Priority Data

Feb. 18, 1974  Netherlands...................... 7402177

[52] U.S. Cl. ............................... 75/67 R; 75/130 R
[51] Int. Cl.$^2$......................................... C22B 26/22
[58] Field of Search............... 75/67 R, 10 A, 130 A

[56] References Cited

UNITED STATES PATENTS

| 2,219,059 | 10/1940 | Suchy et al. ........................ 75/10 A |
| 2,237,011 | 4/1941 | Pokorny............................... 75/67 |
| 2,637,648 | 5/1953 | Udy .................................. 75/67 X |

*Primary Examiner*—M. J. Andrews
*Attorney, Agent, or Firm*—Jones, Tullar & Cooper

[57] ABSTRACT

The invention relates to a process for the preparation of magnesium by reducing an oxidic magnesium containing material with carbon at a temperature between 1000°C and 2000°C in the presence of iron, cobalt, nickel, chromium or manganese; and to magnesium so prepared.

14 Claims, No Drawings

PROCESS FOR THE PREPARATION OF MAGNESIUM

The invention relates to a process for the preparation of magnesium by reducing an oxidic magnesium-containing material at high temperature by means of carbon.

A reaction of this type, in which the temperature used exceeds 2000°C, is known in the art. The assumed reaction MgO + C ⇌ Mg + CO is reversible and two gaseous products magnesium vapour and carbon monoxide) are formed simultaneously, which tend to revert to the original materials at lower temperatures, for example at temperatures between 1120°C and 2000°C. It was therefore necessary to quench the reaction. Although the reaction has been used on a technical scale in this manner, it is difficult and uneconomic.

It has now been found that the reaction between magnesium oxide and carbon can be carried out substantially below 2000°C, if it is ensured that iron, cobalt, nickel, chromium or manganese is also present in the reaction mixture.

The invention therefore relates to a process for the preparation of magnesium by reducing an oxidic magnesium-containing material at high temperatures by means of carbon, characterized in that iron, cobalt, nickel, chromium or manganese is also present in the reaction mixture and that the reduction takes place at a temperature between 1000°C and 2000°C.

The carbon required for the reduction is simply mixed with the metal, e.g. iron, but may also be present in the metal as a solution, if desired as a solid solution. The physical state of the mixture can be derived from the known phase diagrams of carbon and iron (or cobalt or nickel).

The reduction takes place at a temperature between 1000°C and 2000°C, preferably between 1100°C and 1700°C, more preferably between 1200°C and 1600°C, which means a simpler manner of operation and a substantial saving in energy.

In the reduction the iron or other metal is recovered after completion of the reaction. The function of the iron is not entirely clear, it could be described, for example, as a catalyst.

The reaction in the mixture can simply be represented by MgO + C ⇌ Mg + CO. As appears from this reaction equation, for a complete conversion one atom of carbon is required per molecule of magnesium oxide.

In the reaction mixture it is, however, possible to use both an excess and an underdose of carbon. For example, by mixing excess carbon with magnesium oxide and iron, the product obtained after the reaction consists of Fe, C and Mg, if a sufficiently high pressure is applied. This product can, for example, be used for the desulphurization of steel or cast iron.

If an underdose of carbon is used at sub-atmospheric pressure, a residue is obtained which is very easy to remix with the magnesium oxide and carbon to the original ratio, after which the mixture can be reheated. Consequently, the iron is recycled. A good processability of the residue can also be obtained by not allowing the reaction to be completed, so that sintering together of the metal particles in the residue is prevented.

The quantity of iron or other metal used may vary widely; it may be large, for example up to 2000 times the quantity by weight of carbon.

It is more practical to use a quantity of iron up to 25 times the quantity by weight of carbon, while the iron still has its catalysing function in an amount of half the quantity by weight of carbon.

It is also possible to cause the formation of finely divided iron during the reduction process by using iron compounds instead of iron. The iron or iron compounds can be replaced entirely or partly by cobalt, nickel, chromium or manganese, or their compounds.

If during the reaction sufficient carbon in relation to the metal, is invariably present, this will have a favourable effect on the reaction temperature, because the said metals with carbon can form low-melting alloys (eutectics). For example, the eutectic composition iron/carbon melts at about 1150°C.

The reaction can be carried out over a very wide pressure range, for example between $10^{-5}$ mm Hg and $10^4$ mm Hg, in particular between $10^{-3}$ mm Hg and $10^2$ mm Hg.

For the manufacture of magnesium metal it is advantageous that this metal should be recovered from the reaction mixture in the gaseous state.

If the reaction is carried out at a lower temperature, it is advantageous to apply a subatmospheric pressure to increase the reaction rate. For example, a high reaction rate is still measured at 1200°C and a pressure of $10^{-3}$ mm Hg.

The afore-mentioned product, consisting of Fe, C and Mg, is prepared at high pressure.

Now that low reaction temperatures can be used, it is found that the suppression of the reverse reaction Mg + CO ⇌ MgO + C no longer presents any problems. In a simple water-cooled condenser, for example, magnesium metal having a purity of more than 95% was deposited. Readily oxidizable magnesium powder had not been formed; the deposit was readily meltable.

EXAMPLE I

Fe-powder, MgO-powder and C-powder were mixed together and heated in a zirconia crucible in a vacuum furnace. The starting mixture contained 25% by weight of magnesium oxide, 4% by weight of carbon and 71% by weight of iron. The temperature was about 1500°C and the pressure $10^{-3}$ mm Hg. After the test the residue was found to contain no more carbon, and a quantity of 16.8% of magnesium oxide was still present.

EXAMPLE II 52.4 g of a mixture containing 35% of MgO, 15% of C and 50% of Fe was heated at 1200°C for 3 hours at a pressure of 1½ × $10^{-3}$ mm Hg. A weight loss of 46% occurred. The residue still contained 3.9% of magnesium oxide. The magnesium formed was deposited like a mirror in the cooler part of the apparatus.

EXAMPLE III 23.8 g of a mixture of 35% by weight of MgO, 15% by weight of C and 50% by weight of Fe were heated at about 1430°C in a zirconia crucible in a furnace for 3 hours at a pressure of 3.5 mm Hg. The magnesium metal which had been sublimated from the crucible contained 2.7% of oxygen.

EXAMPLE IV 24.83 g of a mixture of 50.5% by weight of MgO, 15.3% by weight of C and 34.2% by weight of Fe were heated in a zirconia crucible for 2 hours at about 1380°C and a pressure of 10 mm Hg. By means of a C-analysis of the residue (13.05 g) it was calculated that 4.57 g of magnesium had been sublimated.

EXAMPLE V 19.8 g of a mixture of 35% of MgO, 15% of C and 50% of Ni were heated at a temperature of 1390°C in an alumina crucible for 1⅔ hours at a pressure of about 3 mm Hg. From the loss in weight of the reaction mixture (35.5%) and the oxygen content of the residue (5.0%) it was possible to calculate that about 77% of the magnesium oxide had been converted.

EXAMPLE VI 27.9 g of a mixture containing 35% of MgO, 15% of C and 50% of Co were heated at 1380°C in a zirconia crucible for 1½ hours at a pressure of about 4 mm Hg. From the loss in weight of the reduction mixture (39%) and the oxygen content of the residue (3.3%) it was possible to calculate that about 85% of the magnesium oxide had been converted.

EXAMPLE VII 98.3 g of a mixture of 40% of MgO, 18% of C and 42% of Fe were heated at a temperature of about 1350°C in a gastight ceramic tube at a pressure of about 10 mm Hg. 19.7 g of magnesium was deposited in a condenser. This magnesium contained 1.8% by weight of O; 1.4% by weight of C and 0.1% by weight of Fe.

We claim:

1. A process for reducing magnesium oxide in an oxidic magnesium-containing material to form magnesium which comprises reacting said oxidic magnesium-containing material with carbon, in the presence of, and in admixture with, an additional material consisting essentially of iron, cobalt, nickel, chromium or manganese metal, and mixtures thereof, at a temperature between 1000°C. and 2000°C., whereby the carbon is consumed reducing magnesium oxide to magnesium, the additional material remaining as the metal, after the reaction.

2. A process, as in claim 1, where the additional material consists essentially of iron metal in admixture with nickel, cobalt, chromium or manganese metal.

3. A process, as in claim 1, where the oxidic material is magnesium oxide.

4. A process, as in claim 1, where the metal is in the form of a powder.

5. A process, as in claim 1, where the reaction is conducted at a pressure between $10^{-5}$ and $10^4$ mm Hg.

6. A process, as in claim 5, where the reaction is conducted at a pressure between $10^{-3}$ and $10^2$ mm Hg.

7. A process, as in claim 1, where the reaction is conducted at a temperature between 1100°C. and 1700°C.

8. A process, as in claim 7, where the reaction is conducted at a temperature between 1200°C. and 1600°C.

9. A process, as in claim 1, where the additional material consists essentially of iron metal.

10. A process, as in claim 9, where more tham one atom of carbon is present for each mole of magnesium oxide and the reaction is carried out at a pressure sufficiently high to form a reaction product comprising a magnesium-carbon-iron mixture.

11. A process, as in claim 9, where less than 1 atom of carbon is present for each mole of magnesium oxide and the reaction is carried out at sub-atmospheric pressure to cause magnesium to be recovered by evaporation, a recyclable residue comprising iron metal remianing.

12. A process, as in claim 9, where at least 0.05 parts by weight of carbon are present per 100 parts of iron metal.

13. A process, as in claim 12, where at least 4 parts by weight of carbon are present per 100 parts of iron metal.

14. A process, as in claim 12, where 4 to 200 parts by weight of carbon are present per 100 parts of iron metal.

* * * * *